UNITED STATES PATENT OFFICE.

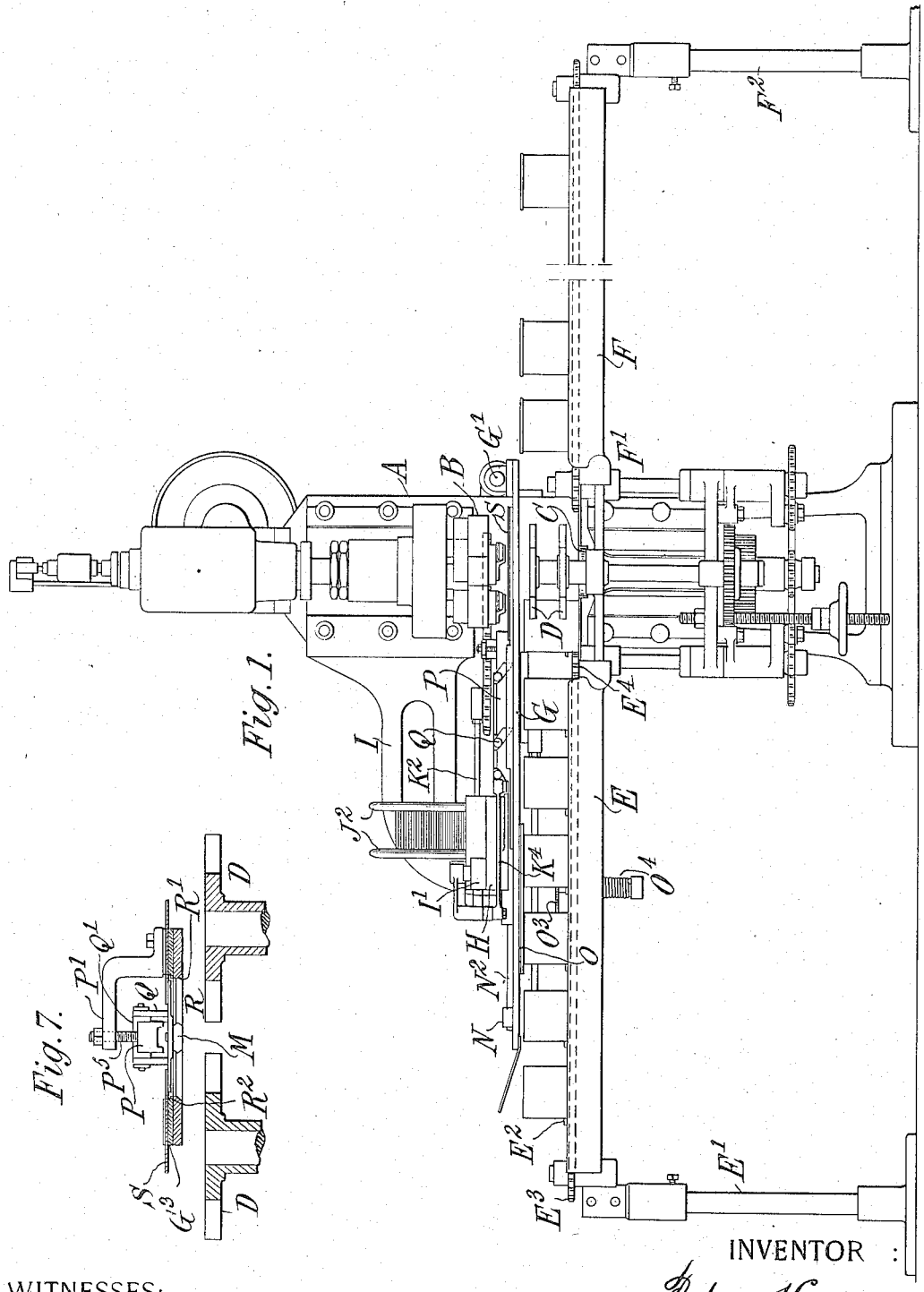

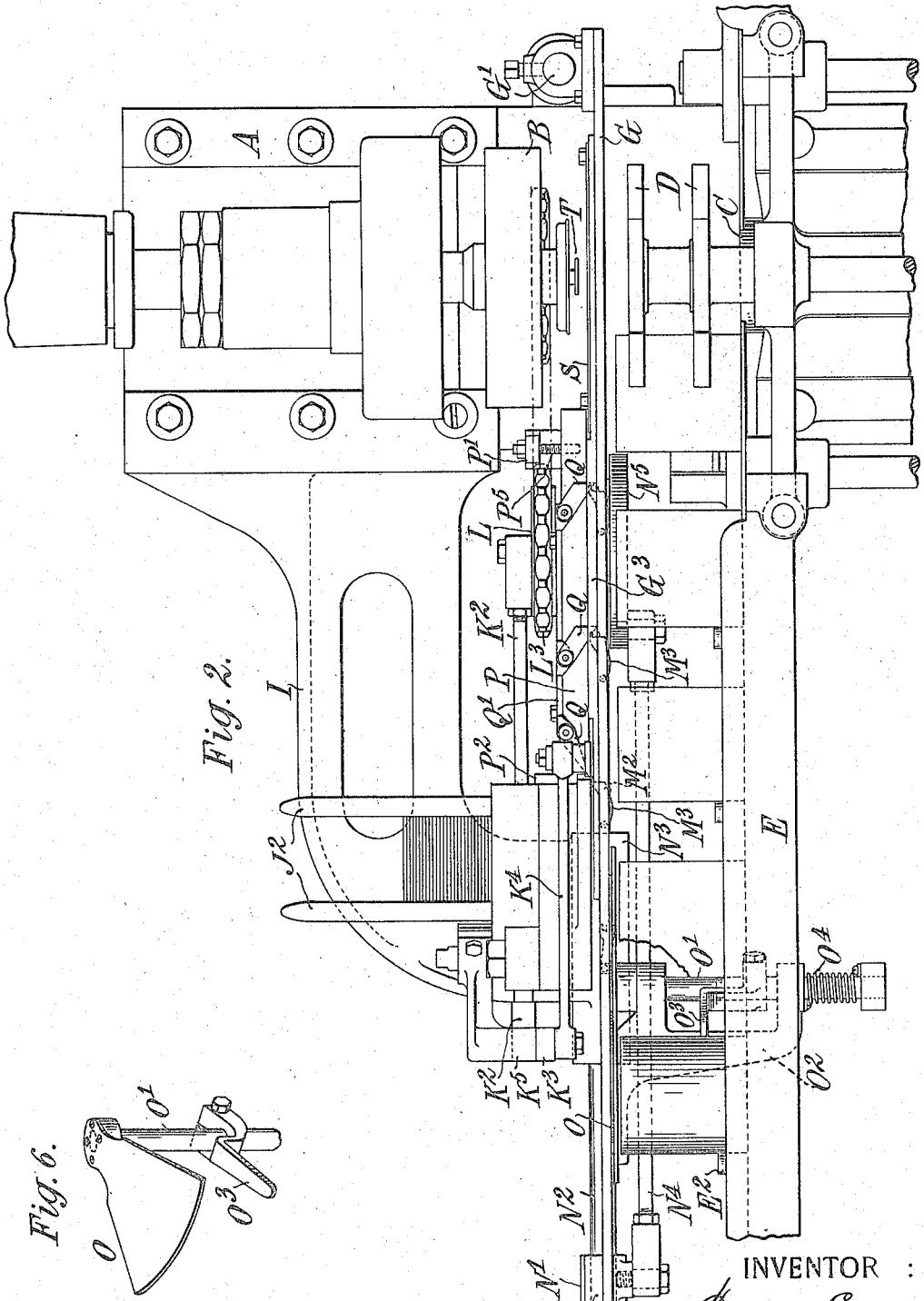

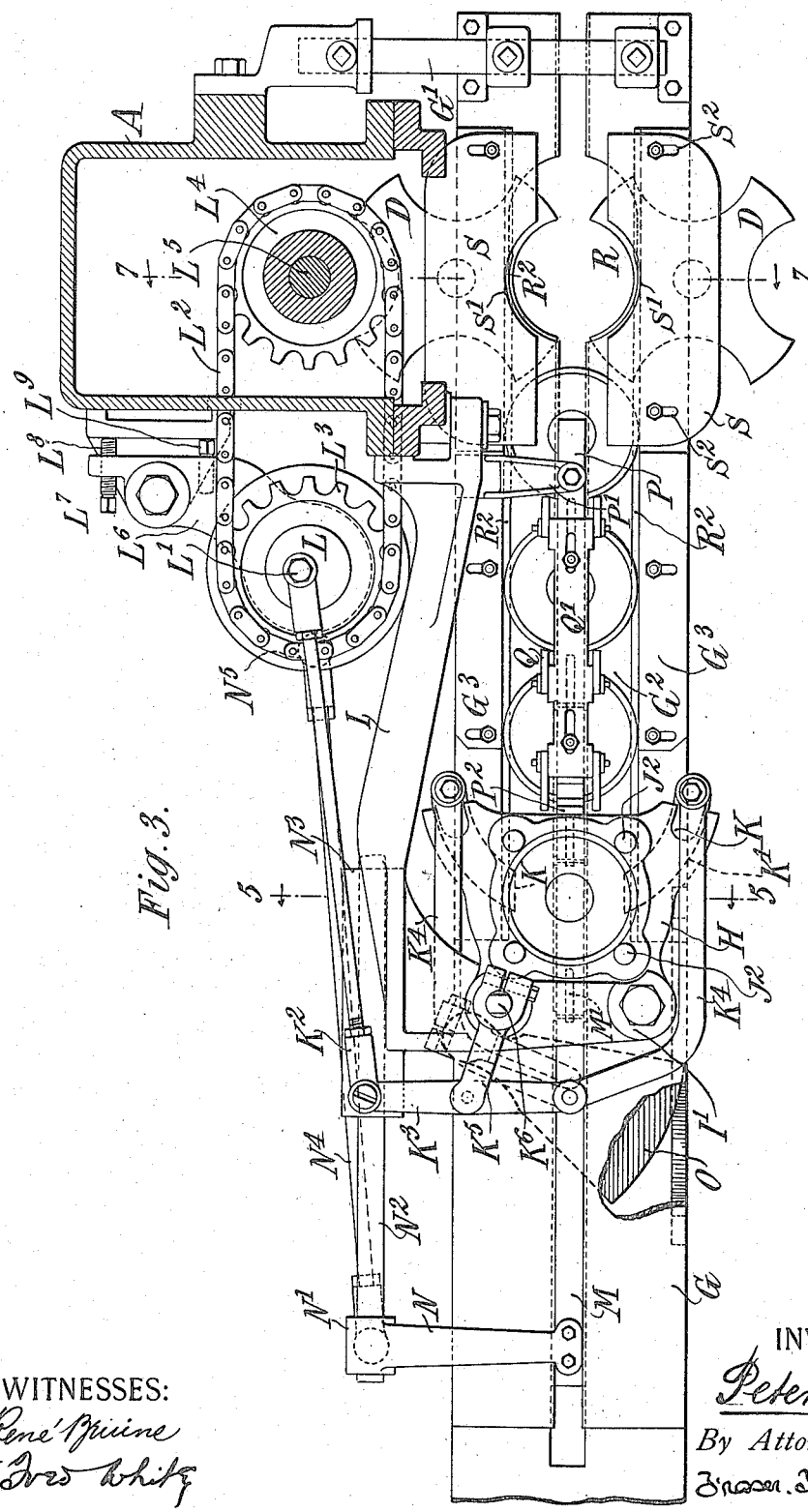

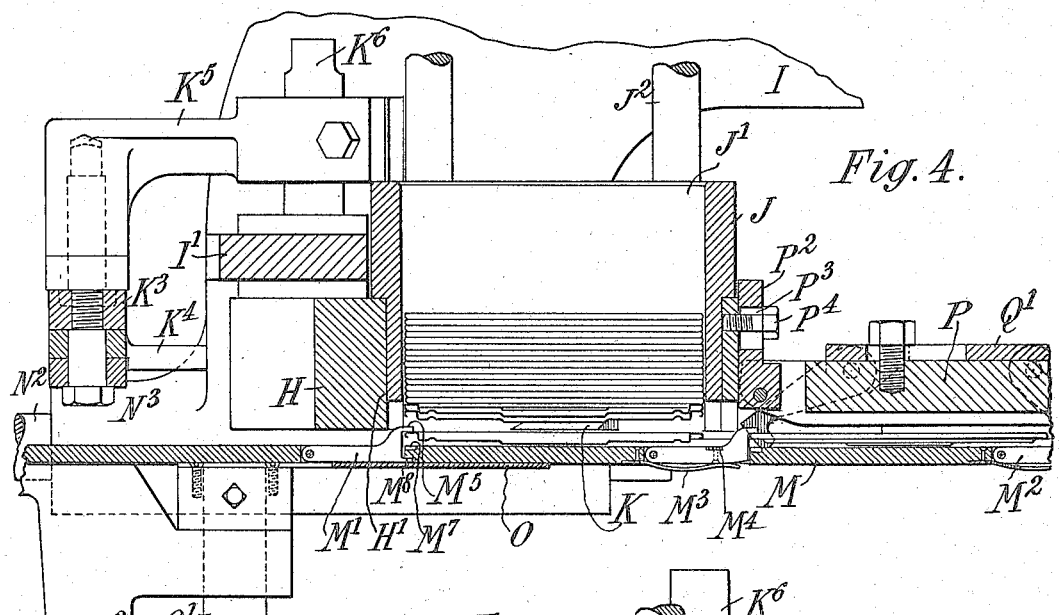
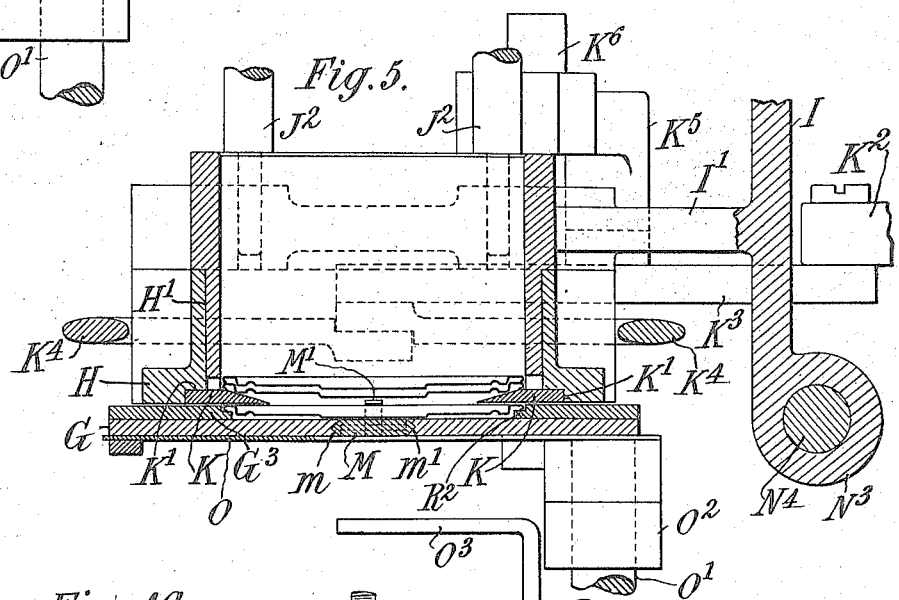
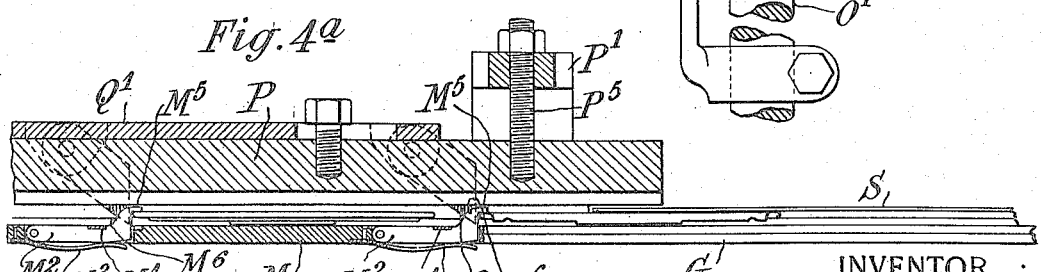

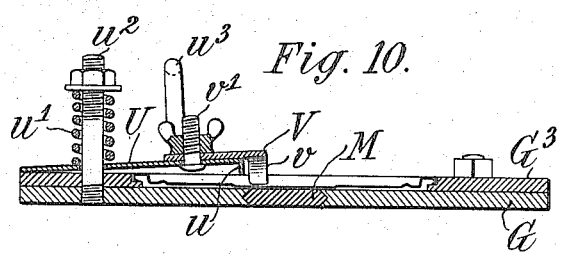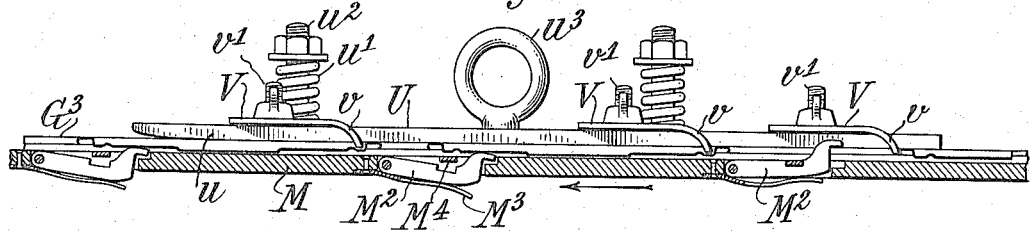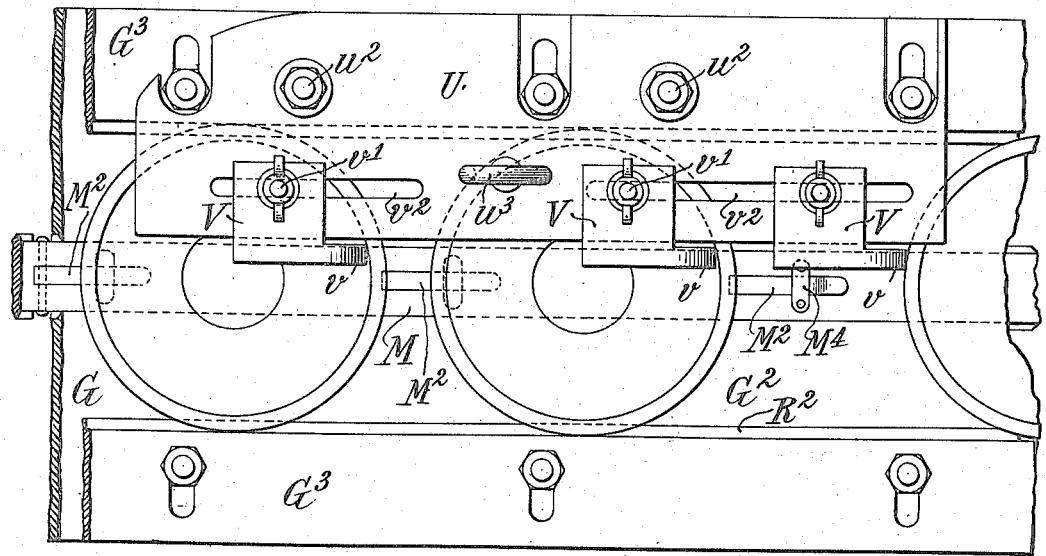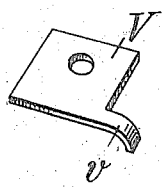

PETER KRUSE, OF NEW YORK, N. Y., ASSIGNOR TO E. W. BLISS COMPANY, OF BROOKLYN, NEW YORK, A CORPORATION OF WEST VIRGINIA.

FEED MECHANISM FOR CAN-HEADS.

1,133,383.    Specification of Letters Patent.    Patented Mar. 30, 1915.

Application filed January 3, 1913. Serial No. 739,974.

*To all whom it may concern:*

Be it known that I, PETER KRUSE, a citizen of the United States, residing in the borough of Brooklyn, county of Kings, city and State of New York, have invented certain new and useful Improvements in Feed Mechanism for Can-Heads, of which the following is a specification.

The present invention relates to mechanism for feeding can-heads or tops especially adapted for machines for seaming can-heads on can bodies.

By the present invention means are provided whereby the feeding of the can-heads may be adequately observed during the working of the machine and whereby the can-heads are under the positive control of the mechanism throughout their movements through the machine, from the time they leave the hopper until they are seamed in place on the can body, so as to thereby obviate the liability of displacement of the can-head while in the machine. Improved means are also provided for controlling the feed of the can-heads in accordance with the feeding of the cans in such manner that a can-head is only fed from beneath the hopper or stack when a corresponding can-body adapted to receive the can-head is fed to the machine. The mechanism is also adjustable to operate upon can-heads of varying dimensions. Other features of improvement will be set forth in the description of the invention which follows.

An embodiment of the invention is illustrated in the accompanying drawings. The improvements are shown as incorporated in a seaming machine constructed in accordance with the machine disclosed in my application Serial No. 722,252, filed September 25, 1912. They may be used in other constructions of seaming machines, however.

Referring to the drawings—Figure 1 is a front elevation of a can-head seaming machine incorporating the present improvements. Fig. 2 is a front elevation of a portion of the machine, showing the can-head and can-body feeding mechanism and the seaming mechanism on an enlarged scale. Fig. 3 is a top plan view of the parts shown in Fig. 2 with the head carrying the seaming rolls omitted and the vertical frame or standard in section. Figs. 4 and 4ª constitute together an enlarged view of a longitudinal vertical cross-section of the can-head feeding mechanism shown in Fig. 3. Fig. 5 is an enlarged view of a transverse vertical cross-section of the can-head feeding mechanism shown in Fig. 3. Fig. 6 is a detail view of the shutter O and finger $O^3$ adapted to coöperate respectively with the finger $M^1$ of the can-head feed bar and the can-bodies on the can-body feed table. Fig. 7 is a view of a cross-section on the line 7—7, Fig. 3, of the end of the feed table G. Fig. 8 is a top plan view of a portion of the feed table, illustrating another embodiment of the means for retaining the can-heads against vertical displacement on the feed table, and against backward movement on the feed table. Fig. 9 is a longitudinal sectional view of the parts shown in Fig. 8. Fig. 10 is a transverse sectional view of the same, and Fig. 11 shows in detail one of the plates having the stop-fingers thereon.

In said drawings A indicates a suitable frame or standard of a machine such as set forth in my aforesaid application. B indicates a suitable seaming mechanism, C a plunger and D, D a pair of clamping disks. On one side of the machine there is a feed table E attached at one end to the frame A and supported at its other end by a post $E^1$, upon which table the cans which are to be headed and seamed are fed to the seaming mechanism. Movement of the cans along the table is effected by a suitable conveyer mechanism comprising fingers $E^2$ adapted to engage the side of the cans, and which fingers are mounted upon a chain $E^3$ passing over a sprocket $E^4$ receiving movement from the driving shaft of the machine.

The cans which have been headed and seamed may be carried off from the seaming mechanism on a table F by means of a suitable conveyer mechanism $F^1$, similar to that employed to feed the cans to the seaming mechanism. The table F is attached at one end upon the frame A and is supported at the other end by a post $F^2$. The above described parts may all be constructed and may operate in the manner set forth in my aforesaid application.

At a level above the tops of the cans and preferably over the feed table E, there is provided a feed table G along which the can-heads are fed to the cans. This table may be supported at one end by an arm $G^1$ fixed to one side of the standard A and may be fastened at its other end to the under side of a shell H secured to an arm $I^1$ of a bracket I fixed to the standard A. The shelf H is provided with a vertical opening $H^1$ which may constitute the hopper for the can-heads. Preferably, however, a separate part J, having an opening $J^1$ therein of a size corresponding to the can-heads, is provided, which is adapted to fit in the opening $H^1$ in the shelf H and constitutes the hopper for the can-heads. By this means hoppers having openings therein corresponding to can-heads of different proportions may be substituted for the hopper J.

$J^2$, $J^2$ are vertical rods projecting from the upper side of the hopper J for the purpose of maintaining the stack of can-heads above the hopper. The upper side of the table G is provided with a broad slide-way $G^2$ extending longitudinally thereof, along which the can-heads are adapted to slide as they are fed to the cans. This slide-way extends beneath the opening $J^1$ in the hopper J and is adapted to receive the lowermost can-head in the stack, can-heads being successively separated from the stack and fed to the can-bodies. At each side of the way $G^2$ there is preferably arranged a guide or retaining strip $G^3$ and these guides or retaining strips may be formed as separate parts and may be adjustably fastened to the table G, whereby the strips may be adjusted transversely of the table in order to accommodate can-heads of different diameters on the slide-way $G^2$.

Means are provided for cutting out or separating the can-head which is to be fed, which is the lowermost can-head in the stack of can-heads, from the stack, and this means preferably comprises a pair of knives K, K constructed and operating in a similar manner to those in my aforesaid application. As shown, the knives K, K are mounted in curved slots $K^1$, $K^1$ in the lower-part of the shelf H and are adapted to be oscillated therein by means of a pitman rod $K^2$ connected thereto through a pivoted lever $K^3$ and links $K^4$, $K^4$, which links are pivotally connected at their ends to said knives and to said lever $K^3$. The lever $K^3$ may be pivoted upon an arm $K^5$ which may be fixed to an extension $K^6$ on one of the bolts which is used for fastening the shelf H to the arm $I^1$ of the bracket I. Suitable means for reciprocating the pitman rod $K^2$ are provided. These means preferably comprise a crank disk L to which the end of the pitman rod $K^2$ is connected by an eccentric crank pin $L^1$, (Fig. 3). The crank disk L may be driven by a sprocket chain $L^2$ passing over teeth $L^3$ formed on its periphery and over a sprocket wheel $L^4$ connected to one of the operating shafts of the machine, as for instance a shaft $L^5$ (corresponding to the shaft K in my aforesaid application) carrying the cam for operating the seaming rolls. The crank disk L is preferably journaled in an arm $L^6$ pivotally mounted in a bracket $L^7$ fixed to the frame or standard A. Set screws $L^8$ and $L^9$ are provided whereby the arm $L^6$ may be adjusted on its pivot in such manner as to take up any slack which may occur in the sprocket chain $L^2$.

The can-head from the lower-part of the stack which is separated by the knives K, K is fed forward on the slide-way $G^2$ by means of a reciprocating feed bar M having a plurality of can-head engaging pawls or fingers $M^1$, $M^a$ thereon. The feed bar M runs longitudinally of the feed table G and is preferably provided with gibs $m$ adapted to slide in correspondingly shaped grooves $m'$ in the feed table G.

The feed bar M receives its reciprocatory movement from an arm N projecting from a collar $N^1$ connected to a slide rod $N^a$ slidably mounted in a socket piece $N^3$ constituting a part of the bracket arm I. The arm N is reciprocated by means of a connecting rod $N^4$ pivotally connected to the collar $N^1$ on the slide rod $N^2$ and to a crank disk $N^5$ which is preferably mounted upon the same shaft as, and moves in unison with, the crank disk L, the crank disk L being driven from the shaft $L^5$ as hereinbefore explained.

The connecting rod $N^4$ is preferably adjustably connected to the collar $N^1$ and to the crank-disk, so that the limits of movement of the feed-bar M may be varied, in order that the machine may operate on can-heads of various diameters. The reciprocation of the feed bar M will therefore cause the fingers $M^1$, $M^2$ to successively feed can-heads which may be separated from the bottom of the stack and be lying upon the top of the feed table G on the slide-way $G^2$.

A can-head which is separated from the bottom of the stack is first engaged by the finger $M^1$ to feed it from beneath the stack, and is then successively engaged by the fingers $M^2$, at successive reciprocations of the feed bar, to feed it to the position above the plunger C where it is to receive the can body.

The fingers $M^2$ are adapted to move beneath and engage the can-heads which are on the table, and which are to be fed forward at succeeding reciprocations of the feed-bar M. For this purpose the fingers $M^2$ are pivotally mounted in the feed-bar in such manner as to pivot vertically therein, and are pressed upwardly into position to engage the can-heads by light springs $M^3$ adapted to yield as the fingers pass under the can-heads. For limiting the upward movement of the fingers $M^2$ under the pressure of the springs, stops $M^4$ may be provided, which are fastened on the feed-bar and extend over the upper sides of the fingers. The tops of the fingers are also preferably provided with small ledges or projections $M^5$ adapted to project over and engage the edges of the can-heads in order that the same may be securely engaged and prevented from rising out of contact with the fingers. The ledges also act against the upper face of the feed-bar as stops to limit the depression of the fingers. The back-sides of the fingers are also preferably rounded or beveled, as indicated at $M^6$, to facilitate the depression of the fingers by the can-heads as they move backward with the backward movement of the feed-bar M and pass beneath the can-heads.

The finger $M^1$ may be constructed similar to the fingers $M^2$ but it is preferred to have the finger $M^1$ operate in such manner that a can-head will only be fed from beneath the stack when a corresponding can body which is adapted to receive a can-head and have the same fastened thereon when operated upon by the seaming mechanism, is fed to the machine. For this purpose there is provided on the under side of the feed table G, a shutter or plate O (Figs. 4 and 6) adapted to move back and forth across, and preferably in contact with, the under side of the feed-bar M in the path of movement of the finger $M^1$. The shutter O may be mounted upon the upper end of a shaft $O^1$ (Figs. 2 and 6) pivotally mounted in a bracket $O^2$ projecting from the under side of the feed table G, and its movement across the under side of the feed-bar M is caused by an arm $O^3$ (Figs. 2 and 5) fixed to the shaft $O^1$ and projecting in the path of movement of the can-bodies on the feed table E. The return movement of the shutter is caused by a torsional coiled spring $O^4$ surrounding the shaft $O^1$ and fixed at one end thereto and at its other end to the bracket $O^2$.

The finger $M^1$ is pivotally mounted in the feed-bar M so as to pivot in a vertical plane, but is not provided with a spring $M^3$ for lifting the same, as are the fingers $M^2$. The finger $M^1$ may therefore, when not supported, drop down under the force of gravity flush with the upper side of the feed bar, and out of position to engage a can-head. The upper side of the finger $M^1$ is preferably provided with a ledge or projection $M^5$ adapted to engage the edges of the can-heads, and which ledge also acts against the upper surface of the feed-bar as a stop for limiting the downward movement of the finger. A recess $M^7$ is provided for the ledge $M^5$ in order to allow it to lie flush with the upper surface of the feed bar, when depressed. A ledge or projection $M^8$ may be provided on the lower side of the finger $M^1$ to act against the lower face of the feed bar as a stop for limiting the upward movement of the finger.

As a can is fed along the feed table E it will come in contact with the arm $O^3$ and cause it to move the shutter O across the under side of the feed bar and into contact with the under side of the finger $M^1$. This movement will be accomplished every time a can body on the feed table passes the arm $O^3$. The finger $M^1$ will thus be lifted and brought into position to engage a can-head and feed the same forward when the feed bar M is reciprocated. When, however, an omission occurs in the feeding of the can bodies, the arm $O^3$ will not be actuated and the shutter O will not be moved to lift the finger $M^1$. Consequently the finger $M^1$ will remain depressed and will fail to engage and feed a can-head as the feed bar is moved forward. So long, therefore, as a can body on the feed table fails to pass and operate the arm $O^3$ of the shutter O, will the feeding of a can-head by the finger $M^1$ be suspended.

As the can-heads are fed from beneath the stack they move beneath an over-hung guide bar P (Fig. 4) which prevents them from rising out of the slideway $G^2$ of the table. The guide bar P is attached at one end to the shelf H and at its other end to an over-hanging bracket arm $P^1$ fixed to the side of the table G. The guide bar P is preferably adjustably mounted so that the height and inclination thereof, with respect to the table G, may be adjusted. For this purpose the end of the guide-bar which is attached to the shelf H is pivotally mounted upon a knuckle piece $P^2$ having an elongated slot $P^3$ therein through which passes a clamping screw $P^4$ adapted to bind the same against the side of the shelf. The knuckle piece may be raised and lowered slightly on the shelf H and thereby vary the height of the guide bar P attached thereto above the table G. The other end of the guide bar P which is attached to the bracket $P^1$ may be connected thereto by means of an adjusting screw $P^5$, and by turning this screw the distance between the guide bar and the top of the table at this end of the machine may be adjusted.

For the purpose of preventing backward movement of the can-heads a series of stops Q, Q are provided. These stops are adapted to lift as the can-heads pass beneath them and drop down behind the can-heads as they are fed past them. The stops Q, Q are preferably pivotally mounted upon a plate Q¹ which may be fastened to, and which may be adjusted longitudinally upon, the guide bar P. By this means the stops Q, Q may be shifted longitudinally of the table G in such manner as to be in proper position to drop behind the can-heads when the machine is adjusted to feed can-heads of various diameters.

The feed table G above the plunger C is provided with an opening R (Fig. 3) adapted to permit the passage of the can bodies therethrough as they are pressed upwardly by the plunger. A bevel R¹ (Fig. 7) may be provided on the under side of the feed table G around the opening R to facilitate entrance of the can bodies therein. The can-heads are fed to a position directly over the position of the can bodies on the plunger C, and consequently over the opening R in the feed table. In order to prevent the can-heads from falling through the opening R, the sides of the longitudinal strips G³ forming the side walls of the slide-way G² of the feed table are provided with narrow ribs or flanges R² adapted to engage the down-turned flanges on the can-heads. These flanges will support the can-heads when they are over the opening R and prevent them from falling through. After the can-head has been seamed or crimped upon the can-body the diameter of the can-head will be slightly reduced, so that the closed can, with the head thereon may be pushed down or descend with the plunger C through the opening R in the feed table, and then be delivered by the disks D, D to the conveying mechanism F¹ on the table F to be carried away from the machine. The flanges R² may be cut away slightly around the opening R, if necessary, in order to permit of this lowering or descending of the closed can.

The can-heads are retained in the slide-way G² of the table G, during the latter part of the movement, before reaching their final position over the plunger C, by plates S, S, fastened to the upper side of the feed table and projecting over the sides of the guide-way G². The adjacent edges of the plates S, S, have cut-away sections S¹, S¹ therein, corresponding to the dimensions and contour of the can-heads, and permitting the can-heads to pass upwardly therethrough when pushed upwardly with the can-body. The plates are preferably slotted, as indicated at S², to permit of their lateral adjustment over the slide-way G².

The can-head, immediately upon reaching its position over the plunger C, where the plates S, S no longer act to confine it in the slide-way G², is pressed upon by the reciprocating knock-out T, which presses down upon the can-heads and maintains them in engagement with the can bodies during the upward movement of the can bodies with the can-heads thereon on the plunger C which raises them to the seaming mechanism. The knock-out T also acts to push out through the opening R the closed cans on which the heads have been seamed. The knock-out T is constructed and is operated in substantially the same manner as the knock-out lettered D¹ in my aforesaid application. The cam which actuates the knock-out T is given a little greater fullness in the present case than in the aforesaid application, so that the knock-out may engage the can head immediately upon the can passing from beneath the side plates S S to its position in the opening R, as aforesaid.

Another embodiment of the means for retaining the can-heads against vertical displacement and for preventing back-movement thereof on the feed-table, is shown in Figs. 8 to 11. In place of the over-hanging bar P and stops O, there may be arranged at one side of the feed table G a plate U adapted to over-hang the slide-way G² and having a down-turned flange $u$ adapted to bear upon the upper sides of the can-heads. The plate U is preferably resiliently pressed and retained in contact with the can-heads in the slide-way by means of springs $u^1$ surrounding bolts $u^2$ passing loosely through the plate U. This construction has the advantage that by lifting the side of the plate U which bears upon the can-tops, defective can-tops may be removed from the slide-way without using a tool upon any of the parts. A handle $u^3$, in the form of an eye-bolt, is preferably provided, by which the plate U may be conveniently grasped to lift the same.

Stops for preventing backward movement may be supported upon the plate U and may be in the form of plates V (Fig. 11) having downwardly projecting fingers $v$ adapted to contact with the rear edge of a can-top or inside the embossed rim thereof. These stop-plates V are preferably fastened to the plate U by means of wing-nuts fitting upon bolts $v^1$ passing through longitudinal slots $v^2$ in the plate U whereby the stop-fingers may be fixed in different longitudinal positions over the slide-way and thereby be adapted to be adjusted to engage can-heads of different diameters.

While the invention has been illustrated and described as operating to apply heads to the tops of can bodies, and is most usefully employed for this purpose, it may be used to advantage for the purpose of applying heads to the bottom of can bodies.

Modifications can be made in the embodiments of the invention illustrated and described without departing from the spirit of the invention.

What I claim is:—

1. Feeding means for can-heads, comprising a feed table, means for feeding said can-heads along said table, and means for preventing backward movement of said can-heads, said means being adjustable longitudinally of the feed table.

2. A feeding means for can-heads, comprising a regularly reciprocatory part, means upon said reciprocatory part adapted to engage a can-head, and can-controlled means adapted to control the operation of said means at successive reciprocations of said moving part to engage or not engage a can-head.

3. Feeding means for can-heads, comprising a moving part, means thereon adapted to engage a can-head, and means adapted to control the operation of said means at successive movements of said moving part to engage a can-head, said controlling means having means adapted to coöperate with a can body whereby the feed of the can-heads may be controlled by the feed of the can-bodies.

4. A feeding means for can-heads, comprising a regularly reciprocatory part, a finger upon said reciprocatory part adapted to engage a can-head, and can-controlled means for controlling the operation of said finger at successive reciprocations of said moving part to engage or not engage said can-heads.

5. Feeding means for can-heads, comprising a moving part, a finger thereon adapted to engage a can-head and means for controlling the operation of said finger at successive movements of said moving part to engage said can-heads, said controlling means having a part adapted to be engaged by a can body, whereby the feeding of the can-heads may be controlled by the feeding of the can bodies.

6. Feeding means for can-heads, comprising a moving part, a finger thereon adapted to engage a can-head, and means movable into and out of the path of movement of said finger adapted to actuate said finger to engage a can-head.

7. Feeding means for can-heads, comprising a moving part a displaceable finger thereon, and means movable into and out of the path of movement of said finger adapted to actuate said finger to engage a can-head.

8. Feeding means for can-heads, comprising a moving part a displaceable finger thereon, and a shutter or plate movable into and out of the path of movement of said finger, adapted to actuate said finger to engage a can-head.

9. Feeding means for can-heads comprising a feed table having an opening therein adapted to permit a can body to pass through the same, means for feeding can-heads along said table to a position over said opening, and means for supporting said can-heads in said opening until said can-heads are received by a can body, said supporting means being made in a plurality of parts, said parts being adjustable, whereby the supporting means may be adjusted to support can-heads of different dimensions.

10. Feeding means for can-heads, comprising a feed table having an opening therein adapted to permit a can-body to pass through the same, means for feeding can-heads along said table to a position over said opening, and means for supporting said can-heads in said opening until said can-heads are received by a can body, and means for preventing displacement of said can-heads in proximity to said opening, said means comprising plates adapted to project over the edges of the can-heads, said plates being adjustable to accommodate can-heads of different dimensions and having cut-out portions therein permitting said can-heads to pass through the same axially coinciding with the opening in said feed table.

11. Feeding means for can-heads, comprising a hopper adapted to contain a stack of can-heads, means for separating a can-head from said stack, a feed table below said hopper on which said separated can-heads are adapted to drop, means for feeding can-heads along said table, and reciprocating means for actuating said separating and feeding means, said means comprising a plurality of crank-disks upon a shaft adapted to be driven from a driven shaft, and connecting rods attached to said disks.

12. In a seaming machine, the combination of means for feeding can-heads, said means comprising a regularly operating feed-bar having a finger thereon adapted to engage can-heads, means for feeding can bodies, and means adapted to be actuated by can-bodies for controlling the operation of said finger to engage or not engage can-heads.

13. In a seaming machine, the combination of seaming mechanism, means for feeding can-bodies, means for correspondingly feeding can-heads, a reciprocating part having a finger thereon for feeding can-heads, means for controlling the operation of said finger to engage can-heads adapted to be actuated by the can-bodies, and means for bringing said can-bodies into engagement with said can-heads and into position to be operated upon by the seaming mechanism.

14. Feeding means for can-heads, comprising a feed-table, means for feeding can-heads, and means for retaining said can-heads against vertical displacement on said table, said means being fixed at one side of said feed table, and movable to permit removal of can-heads from said feed-table.

15. Feeding means for can-heads, comprising a feed-table, means for feeding can-heads, and means for retaining said can-heads against vertical displacement on said table, and means for pressing said retaining means against said can-heads, said means being adapted to yield to permit said retaining means to be lifted so that can-heads may be removed from the feed-table.

In witness whereof, I have hereunto signed my name in the presence of two subscribing witnesses.

PETER KRUSE.

Witnesses:
 ARTHUR C. FRASER,
 FRED WHITE.